May 18, 1954   K. K. KEARBY ET AL   2,678,904
OLEFIN POLYMERIZATION PROCESS
Filed July 13, 1950
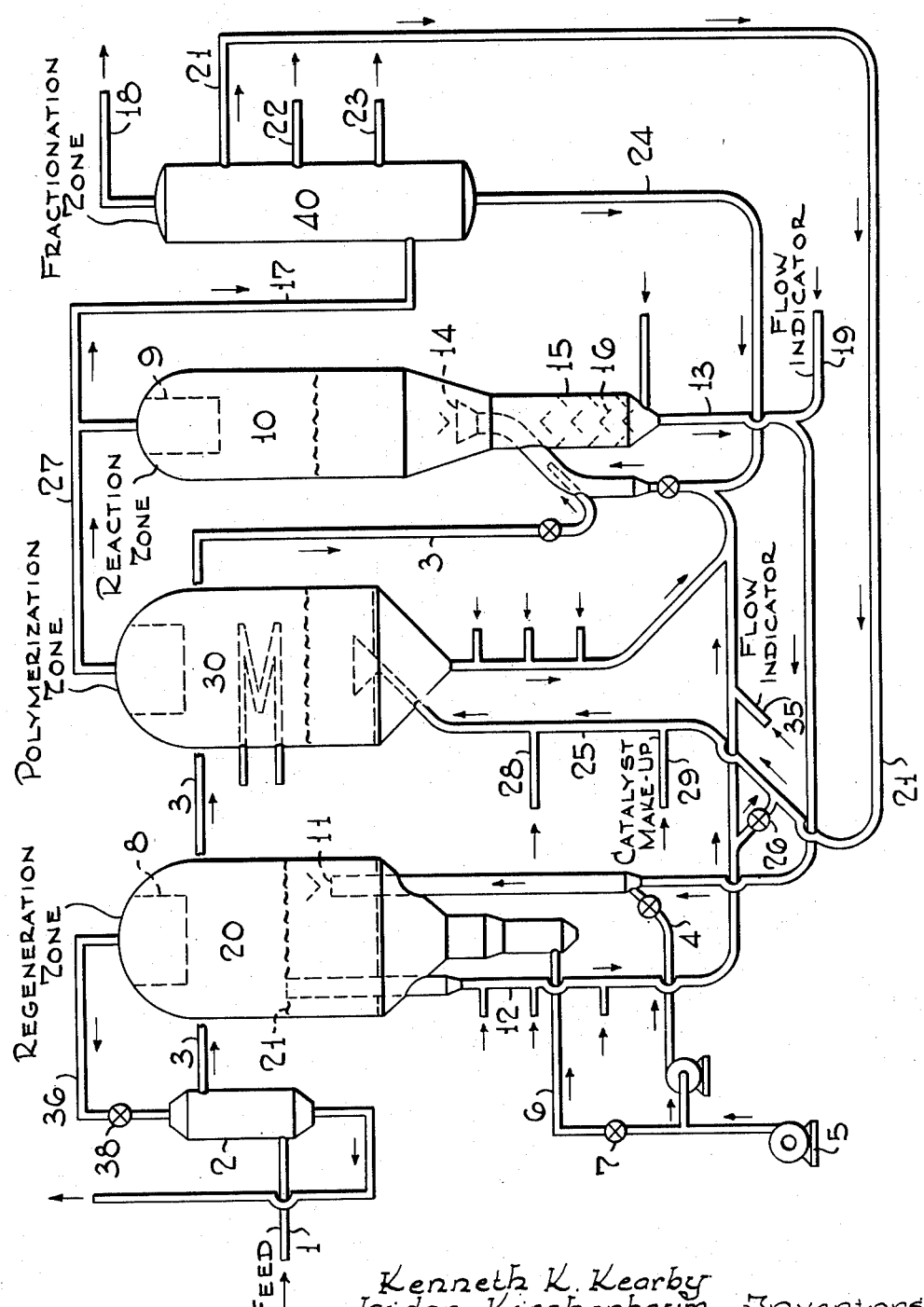
Kenneth K. Kearby
Isidor Kirshenbaum   Inventors
John O. Smith, Jr.
By W. O. T Heilman   Attorney Patented May 18, 1954

2,678,904

UNITED STATES PATENT OFFICE 2,678,904

OLEFIN POLYMERIZATION PROCESS

Kenneth K. Kearby, Cranford, Isidor Kirshenbaum, Union, and John O. Smith, Jr., North Plainfield, N. J., assignors to Standard Oil Development Company, a corporation of Delaware Application July 13, 1950, Serial No. 173,634

6 Claims. (Cl. 196—52)

The present invention is concerned with an improved polymerization process. The invention is more specifically directed towards a low pressure olefin polymerization process utilizing a fluidized polymerization catalyst. A specific concept of the present invention is to employ the low pressure polymerization operation in conjunction with a low pressure refining operation such as a low pressure catalytic cracking step and to use as the catalyst a silica-alumina catalyst, particularly one promoted with hydrogen chloride.

It is well known in the art to treat olefins and olefin-containing streams with various catalysts, as for example, with acids of phosphorous in order to polymerize the olefins to higher boiling hydrocarbon constituents. In general, the polymerization feed streams comprise normally gaseous olefins, such as ethylene, propylene, butylenes, pentylenes and mixtures thereof, which are polymerized to hydrocarbon constituents which boil in the motor fuel boiling range, i. e., below about 420° F. Although 100% olefinic streams may be utilized as feed stocks, it is generally preferred to have paraffinic diluents present in a concentration in the range of from about 40% to 90% by weight in order to minimize and reduce the formation of carbonaceous deposits on the catalyst and to provide better temperature control in the catalyst bed. These phosphoric acid catalysts are usually deposited on solid carriers, as for example, diatomaceous earth, kieselguhr, silica gel, and the like.

In general, these catalysts are satisfactory for securing the polymerization of the olefins in the feed stream. However, there exist certain inherent disadvantages with respect to their uses. For example, the catalysts require the presence of water vapor in the feed in order to maintain activity, but in the presence of water these catalysts lose mechanical strength and disintegrate. Moreover, these phosphoric acid catalysts are easily poisoned by impurities such as ammonia, excessive water, hydrogen sulfide, etc. Consequently it is necessary to submit the feed to extensive purification prior to passing it over the phosphoric acid type catalyst.

It has now been discovered that improved polymerization is secured by employing relatively low pressures in conjunction with a silica-alumina type catalyst. The present invention may be more fully understood by reference to the drawing illustrating embodiments of the same when used in conjunction with, for example, a catalytic cracking operation.

Referring specifically to the drawing a hydrocarbon feed stream boiling, for example in the gas oil boiling range (400° to 700° F.), is introduced into the system by means of feed line 1. The system comprises a reaction zone 10, a polymerization zone 30 and a regeneration zone 20, employed in conjunction with a fractionation zone 40. The fluid type reactor 10 and the fluid catalyst regenerator 20 are arranged at approximately an even level. The operation of the fluid catalytic reaction zone and the fluid regeneration zone is conventional, which preferably is as follows:

An overflow pan 21 is provided in regeneration zone 20 at the desired catalyst level. The catalyst overflows from pan 21 into withdrawal line 12 which has the form of a U-shaped seal leg connecting regeneration zone 20 with reaction zone 10. The feed stream introduced by means of line 1 is preheated to a temperature usually in the range from about 600 to 650° F. in exchanger 2 in heat exchange with regenerator flue gases which are removed overhead from zone 20 by means of line 36. The heated feed stream is withdrawn from exchanger 2 by means of line 3 and introduced into line 12 at a point close to where line 12 enters the reactor 10. The seal leg of line 12 should be sufficiently below the point of feed oil injection to prevent oil vapors from backing into regenerator 20 in case of normal surges. Since there is no restriction in the overflow line 12 from regenerator 20, satisfactory catalyst flow will occur as long as the catalyst level in reactor 10 is slightly below the catalyst level in regenerator 20. Spent catalyst from reactor 10 flows through a second U-shaped seal leg 13 from the bottom of reactor 10 into the bottom of regenerator 20. This flow of catalyst in line 13 is secured by injecting air, preferably at a mid-point in the rising leg of pipe 13 through lines 6 and 4 by means of pump 5. The rate of catalyst flow is controlled by injecting the air at the two different elevations as indicated. Thus, by throttling the amount of air flowing through the upper pipe 6 by means of valve 7, the amount of air flow through lower pipe 4 is increased whereby the average density of the suspension in the rising leg of pipe 13 is decreased resulting in an increased catalyst flow rate through pipe 13. Valve 7 may be controlled as a function of the regenerator temperature to maintain the latter at any desired level.

The pressure in regenerator 20 may be controlled at the desired level by a throttle valve 38 in the overhead line 36 from regenerator 20. Thus, the pressure in regenerator 20 may be controlled at any desired level by throttle valve 38 which may be operated, if desired, by a differential pressure controller. If the pressure differential between the two vessels is maintained at a minimum, the seal legs of conduits 13 and 12 will prevent gases from passing from one vessel into the other in the event that the catalyst flow in the legs should cease. As a further safety precaution, a Venturi flow indicator 19 may be placed in the seal leg of conduit 13. A similar indicator 35 may be utilized in conduit 12 as shown. Indicator 19 may operate a cut-off on blower pump 5 to discontinue the flow of air in the event that the catalyst flow through conduit 13 decreases or ceases. Similarly controller 35 may be designed to decrease or cut-off the oil feed through line 1 in the event that the catalyst flow through conduit 12 ceases.

The reactor 10 and the regenerator 20 are designed for high velocity operation involving linear superficial gas velocities of from about 2.5 to 4 ft. per second. Catalyst losses are minimized and substantially prevented in reactor 10 by the use of stages of cyclone separators 9. Regeneration zone 20 is provided with cyclone separators 8. These cyclone separators are usually from 2 to 3 and more stages.

Although distributing grids are not employed in zones 10 and 20, they may be. However, distributing zones 11 and 14 are provided as shown. Reaction zone 10 is provided with an extended stripper 15 which may contain disk and doughnut type baffles 16.

Operating temperatures and pressures may vary appreciably depending upon the feed stocks and upon the products desired. Operating temperatures are, for example, in the range from about 800 to 1000° F., preferably about 800 to 900° F. in the reaction zone. Elevated pressures may be employed, but in general pressures below 100 lbs. per sq. in. gauge are utilized. Pressures generally in the range from 1 to 30 lbs. per sq. in. gauge are preferred. A catalyst hold-up of about 15 to 30 tons is utilized and catalyst to oil ratios of about 3 to 10, preferably about 6 to 7 by weight are used.

In accordance with the present invention the above described catalytic cracking operation is used in conjunction with a low pressure olefin polymerization process. The cracked products are removed overhead by means of line 17 and introduced into distillation zone 40. Temperature and pressure conditions in zone 40 are adapted to remove overhead by means of line 18 hydrocarbon constituents boiling below the boiling range of propane. A stream comprising $C_3$ and $C_4$ olefins is removed by means of line 21 while a stream boiling in the gasoline boiling range is removed by means of line 22. Higher boiling constituents are removed by means of line 23 while the heaviest fraction is removed by means of line 24. It is to be understood that zone 40 may comprise any number and arrangement of distillation and fractionation zones in order to secure the desired number of streams.

The regenerated catalyst is withdrawn from zone 20 by means of line 12 and combined as described with the fresh feed to cracking zone 10. In accordance with a preferred adaptation of the present invention, a portion of the regenerated catalyst is segregated by means of line 25 and valve 26 and mixed by means of line 21 with an olefin feed stream which is preferably segregated in distillation zone 40. Temperature and pressure conditions in zone 30 are adjusted to secure the desired polymerization of the olefins. A polymer product is removed overhead from zone 30 by means of line 27 and is preferably introduced into fractionating zone 40.

The present invention is broadly concerned with a low pressure polymerization operation wherein a fluidized type of catalyst is employed. The invention is more particularly concerned with the use of a catalyst comprising silica-alumina. A catalyst promoted with hydrogen chloride is particularly effective. The hydrogen chloride is introduced into line 25 by means of line 28. While the example shown in the drawing is the preferred method of operation, it is to be understood that the polymerization process can be used in conjunction with any moving bed catalytic cracking process and that the reactors may be at the same level, above, or below the regenerator.

It has been found that excellent results are obtained when using the silica-alumina cracking catalyst but other cracking catalysts or their equivalents, such as alumina-boria, alumina-zirconia, alumina-silica-zirconia, alumina-silica-titania, alumina-titania, silica-zirconia, activated clays, silica-titania, silica-zirconia-titania, silica-magnesia and the like may also be used in accordance with the invention.

Temperature and pressure conditions in polymerization zone 30 may be varied appreciably. Preferred temperatures are in the range from 350° F. to 750° F. Excellent olefin conversion and good selectivity to gasoline polymer is secured with a temperature in the range from about 450° F. to 650° F. Pressures are approximately the pressures employed in the regenerator and are below about 100 lbs. per sq. in. gauge usually in the range from about 1 to 30 lbs. per sq. in. gauge. Although the feed rate may be varied over a wide range, optimum conversions are obtained in the range of from about 0.3 to 1.5 v./v./hr., when the total pressure of 20 p. s. i. g. is used and the olefin content of the feed is about 30–40 mol. per cent. At higher pressures and with more concentrated olefin streams, shorter contact times may be used with advantage.

When employing the present invention in conjunction with a cracking operation, particularly a catalytic cracking operation, the conventional cracking catalysts and temperatures are utilized. Conventional catalysts are oxides of metals of groups II, III, IV and V of the periodic table. A preferred catalyst comprises silica-alumina wherein the weight per cent of the alumina is in the range from about 5 to 20%. These catalysts may also contain a third constituent, as for example, $ThO_2$, $WO_3$, $MoO$, $BeO$, $Bi_2O_3$, $CdO$, $UO_3$, $B_2O_3$, $SnO_2$, $Fe_2O_3$, $V_2O_5$, $MnO$, $Cr_2O_3$, $CaO$, $Tl_2O_3$, $MgO$ and $Ce_2O_3$ present in the concentration from 0.05% to 0.5%.

If the catalyst is activated by means of hydrogen chloride, the amount of hydrogen chloride employed should, preferably, be in the range of 0.3 to 2 weight per cent on feed, although both larger and lower concentrations can be used with advantage.

The present invention may be further understood by the following examples illustrating embodiments of the same:

EXAMPLE 1

A catalyst comprising about 13% $Al_2O_3$—87% $SiO_2$ (on a water free basis) was employed to polymerize a feed stream comprising olefins under the conditions shown in the following table:

*Effect of feed rate on conversion level*

Catalyst: 13 $Al_2O_3$—87 $SiO_2$; 20 p. s. i. g.; 500° F.; 1 wt. Percent HCl Promotion.
Feed: 19% $C_3$=+11% $C_4$=in $C_3$ and $C_4$ Blend (wt. percent).

| | | | |
|---|---|---|---|
| Feed Rate, liq. v./v./hr.* | 0.5 | 1.0 | 2.0 |
| Olefin Conversion, Mol. Percent | 91 | 88 | 45 |

*The feed rate is given as volumes of feed at 60° F. (as liquid) passing per hour over one volume of catalyst.

From the above it is apparent that under the conditions of operation, the feed rate is maintained in the range from about .3 to 1.0 v./v./hr.

EXAMPLE 2

Similar operations were conducted wherein the catalyst residence time in the polymerization zone was varied. The results of these operations are as follows:

*Effect of catalyst residence time on olefin conversion level*

Catalyst: 13 $Al_2O_3$—87 $SiO_2$; 20 p. s. i. g.; 500° F.; 0.5 v./v./hr.
Feed: 19% $C_3$= + 11% $C_4$= in $C_3$ and $C_4$ Blend (wt. percent).

| | | | |
|---|---|---|---|
| Catalyst Residence Time, hrs.* | 0.75 | 1 | 1.75 |
| Olefin Conversion, mol. percent | 96 | 87 | 67 |

*The catalyst residence time is the average time in hours that individual lumps or particles of catalyst remain in the polymerization reactor in contact with the feed.

From the above it is apparent that the catalyst residence time should be below about 1, preferably below about .75.

EXAMPLE 3

As illustrated in the drawing the catalyst may enter the polymerization reactor directly from the regenerator. In a catalyst fluid unit, operating with the silica-alumina catalyst, the temperature of the catalyst is usually in the range of from about 1050–1100° F. The make-up catalyst for the catalytic cracking unit may be added either partly or completely to the catalyst entering the polymerization unit thus controlling the temperature. It is within the concept of the present invention to employ cooling means on the catalyst introduced into zone 30 by means of line 25 in order to secure the preferred polymerization temperature at the bottom of zone 30. However, the excessive heat of the catalyst, as well as, the endothermic heat of the polymerization process may be removed as steam by means of the internal heat exchanger in zone 30. By this means one heat exchanger installation can control the temperature in the polymerization unit. Also, by controlling the proportion of the fresh catalyst to used catalyst entering zone 30, it is possible to modify the catalyst activity in the polymerization reactor without changing the feed rate, catalyst residence time or temperature. For instance the effect of adding fresh catalyst on the conversion level of the cracking catalyst may be appreciated from the following data obtained at 20 p. s. i. g.; 500–550° F.; 0.5 v./v./hr.; 2 hour residence time; using the 13 $Al_2O_3$—87 $SiO_2$ catalyst with a mixed olefin feed containing 19% $C_3H_6$ and 11% $C_4H_8$ in propane-butane mixture.

*Effect of catalyst age*

[13 $Al_2O_3$—87 $SiO_2$; HCl Activation.]

| Catalyst Used | Fresh | Equilibrium Catalyst* From Catalytic Cracking Unit |
|---|---|---|
| Temperature of Reaction, °F | 500 | 550 |
| Olefin Conversion, Mol. Percent | 87 | 58 |

*An equilibrium catalyst is the catalyst in a catalytic cracking unit which has attained a relatively constant activity level as a result of the opposing effects of fresh catalyst addition and catalyst deactivation. Equilibrium catalyst contains small amounts of iron, vanadium, etc. compounds.

From the above it is apparent that the conversion level is appreciably increased by adding the fresh make-up cracking catalyst to the polymerization zone.

The catalyst from the polymerization zone may be passed into the regenerator or into the catalytic cracking zone, however, it is preferred to return the catalyst to the cracking zone since this procedure has the advantage of permitting the recovery of heavypolymer on the catalyst by cracking to useful products. For example, a fresh alumina-silica catalyst was used for the polymerization of a mixed olefin stream at 500° F. and 20 p. s. i. g. The carbonized catalyst after removal from the unit was extracted with benzol and found to contain at least 7% of the deposited coke as benzol-soluble organic compounds. In a polymerization plant for a 41,000 B/D catalytic cracking unit, this soluble organic matter may be of the order of 1½ tons per day. However, if the catalyst is returned directly to the regenerator, it may be added through the spent catalyst line, or preferably directly to the regenerator close to or before the cyclones. By this procedure, the comparatively cool catalyst will serve to remove heat from the flue gases, heat which now is dissipated by dilute phase water sprays.

The cracking catalyst loses polymerization activity with time on stream and requires regeneration in order to maintain a high conversion level. This limits the catalyst residence time in the polymerization reactor. It has been found that the rate of deactivation can be markedly decreased by the addition of an acidic gas such as HCl to the feed. As little as 1% HCl (on feed) helps maintain the conversion level of both fresh and regenerated cracking catalysts. These data are summarized in the following table:

*Effect of HCl on catalyst*

[13% $Al_2O_3$—87% $SiO_2$]

| | Olefin Conversion Mol Percent | | | |
|---|---|---|---|---|
| Hours On Stream | Regenerated Catalyst, 600° F., 1 v./v./hr. | | Fresh Catalyst, 500° F., 0.5 v./v./hr. | |
| | HCl Activation | No HCl | HCl Activation | No HCl |
| 0.5 | 59 | 40 | | |
| 1.0 | 51 | 29 | 91 | 89 |
| 1.5 | 49 | 24 | 89 | 71 |

The amount of HCl added to the feed should preferably be in the range of 0.3–2 weight percent on feed, although both large and lower concentrations can be used with advantage. Other inorganic acids such as HF or other halides, acidic type compounds such as organic acids, like acetic, naphthenic, etc., may be used with advantage in activating the catalyst in the polymerization reaction. Compounds such as NH₄F, NH₄Cl, CaF₂, alkyl halides, etc. also serve as promoters in accordance with the invention. These compounds may be added to the feed or can be used to activate the catalyst prior to its being led into the polymerization reactor.

The olefin feed may be added directly from the fractionator into the polymerization reactor. Although the invention has the advantage of not requiring the preheating of the feed, the feed may, if desired, be preheated to any desired temperature before it enters the reactor. A typical feed from the fractionator contains as impurities $H_2O$, $H_2S$, CO, $CO_2$ and traces of oxygen, as well as, ethylene, ethane, etc. Although one advantage of the invention lies in the fact that extensive feed purification is not required, increased catalyst activity and decreased carbon formation can be obtained by controlling the water content of the feed. High selectivity to gasoline polymer may also be maintained by controlling the water content of the feed. Likewise, a control of the sulfur content of the feed will often result in improved product quality. With some feeds more extensive purification may be needed. In such cases the feed may be water washed; caustic washed or treated with a guard catalyst which may comprise a cracking catalyst.

Having described the invention it is claimed:

1. An improved continuous process for the production of hydrocarbon constituents boiling in the motor fuel boiling range which comprises contacting a vaporized hydrocarbon fraction boiling above the motor fuel boiling range with a fluidized solid cracking catalyst at a cracking temperature in a cracking zone, removing catalyst from said cracking zone and passing same to a regenerating zone, regenerating said catalyst at a temperature substantially above said cracking temperature, removing cracked products from said cracking zone and passing same to a distillation zone, removing segregated hydrocarbons comprising normally gaseous olefins from said distillation zone and passing same to a polymerization zone, withdrawing regenerated catalyst from said regeneration zone and dividing same into first and second streams, passing the first regenerated catalyst stream to said polymerization zone, contacting the olefin-containing stream with said first catalyst stream in fluidized form at a polymerization temperature substantially below said cracking temperature and a pressure below about 100 p. s. i. g., removing catalyst from said polymerization zone, combining said catalyst from said polymerization zone and the second stream of regenerated catalyst and passing the combined catalyst streams to said cracking zone, said combined catalyst streams comprising said fluidized cracking catalyst, removing polymerized products from said polymerization zone and passing same to said distillation zone, and recovering hydrocarbons boiling in the motor fuel boiling range from said distillation zone.

2. A process as defined by claim 1 wherein said cracking temperature is in the range of about 800 to 1000° F. and said polymerization temperature is in the range of about 350° to 750° F.

3. A process as defined by claim 2 wherein said polymerization is carried out at an olefin feed rate in the polymerization zone not in an excess of about one volume per volume of catalyst per hour, and at a catalyst residence time in said polymerization zone not in excess of about one hour.

4. A method as in claim 3 wherein said catalyst comprises silica and alumina.

5. A process as defined by claim 4 wherein fresh make-up catalyst required in said process is added to said polymerization zone.

6. The process as defined in claim 4 wherein said regeneration temperature is above about 1050° F.

References Cited in the file of this patent

UNITED STATES PATENTS

| Number | Name | Date |
|---|---|---|
| 2,068,016 | Gayer | Jan. 19, 1937 |
| 2,129,733 | Fulton et al. | Sept. 13, 1938 |
| 2,407,817 | Danner | Sept. 17, 1946 |
| 2,425,555 | Nelson | Aug. 12, 1947 |
| 2,450,724 | Grote | Oct. 5, 1948 |
| 2,461,958 | Bonnell | Feb. 15, 1949 |
| 2,470,166 | Hetzel et al. | May 17, 1949 |
| 2,488,032 | Johnson | Nov. 15, 1949 |